(12) United States Patent
Nip

(10) Patent No.: US 8,475,584 B1
(45) Date of Patent: Jul. 2, 2013

(54) ZINC CLAYS, ZINC ORGANOCLAYS, METHODS FOR MAKING THE SAME, AND COMPOSITIONS CONTAINING THE SAME

(76) Inventor: Raymond Lee Nip, Bankok (TH)

( * ) Notice: Subject to any disclaimer, the term of this patent is extended or adjusted under 35 U.S.C. 154(b) by 385 days.

(21) Appl. No.: 12/577,370

(22) Filed: Oct. 12, 2009

(51) Int. Cl.
*C04B 14/04* (2006.01)

(52) U.S. Cl.
USPC ............................ 106/486; 523/400; 428/403

(58) Field of Classification Search
None
See application file for complete search history.

(56) References Cited

U.S. PATENT DOCUMENTS

| | | | |
|---|---|---|---|
| 2,139,995 A | 12/1938 | Breyer et al. | |
| 2,531,427 A | 11/1950 | Hauser et al. | |
| 3,501,418 A * | 3/1970 | Briggs et al. | 502/65 |
| 3,541,012 A * | 11/1970 | Stuebe | 508/243 |
| 3,725,528 A * | 4/1973 | Banin | 423/112 |
| 3,902,886 A * | 9/1975 | Banin | 71/1 |
| 3,974,125 A | 8/1976 | Oswald et al. | |
| 4,402,881 A | 9/1983 | Alther | |
| 4,664,842 A | 5/1987 | Knudson, Jr. et al. | |
| 4,690,868 A | 9/1987 | Rice | |
| 4,739,007 A | 4/1988 | Okada et al. | |
| 4,752,342 A | 6/1988 | Tatum et al. | |
| 4,765,908 A | 8/1988 | Monick et al. | |
| 4,798,766 A | 1/1989 | Rice | |
| 5,039,377 A | 8/1991 | von Raven et al. | |
| 5,334,241 A | 8/1994 | Jordan | |
| 6,515,087 B2 | 2/2003 | Hsu et al. | |
| 6,521,690 B1 | 2/2003 | Ross et al. | |
| 6,727,311 B2 | 4/2004 | Ajbani et al. | |
| 6,730,719 B2 | 5/2004 | Powell | |
| 6,759,464 B2 | 7/2004 | Ajbani et al. | |
| 6,767,952 B2 | 7/2004 | Dontula et al. | |
| 6,787,592 B1 | 9/2004 | Powell et al. | |
| 6,849,680 B2 | 2/2005 | Knudson, Jr. et al. | |
| 6,858,665 B2 | 2/2005 | Larson | |
| 6,861,462 B2 | 3/2005 | Parker et al. | |
| 6,884,835 B2 | 4/2005 | Ajbani et al. | |
| 7,025,873 B2 | 4/2006 | O'Connor et al. | |
| 7,055,566 B2 | 6/2006 | Ajbani et al. | |
| 7,342,065 B2 | 3/2008 | Yang et al. | |
| 7,407,999 B2 | 8/2008 | Tsou et al. | |
| 2006/0199890 A1 | 9/2006 | Fasulo et al. | |
| 2006/0269472 A1 * | 11/2006 | Mackinnon et al. | 423/700 |
| 2007/0072959 A1 | 3/2007 | Nip | |
| 2007/0199481 A1 | 8/2007 | Roelofs | |
| 2008/0269396 A1 | 10/2008 | Karanam et al. | |
| 2009/0197790 A1 * | 8/2009 | Sengupta et al. | 510/372 |

FOREIGN PATENT DOCUMENTS

WO 2004/052981 A1 6/2004

OTHER PUBLICATIONS

Nelson, Stephen A., Phyllosilicates (Micas, Chlorite, Talc, & Serpentine), Tulane University, Earth Materials (EENS 211) (Sep. 24, 2008) (http://www.tulane.edu/~sanelson/eens211/phyllosilicates.htm).*
International Search Report including Search History and Written Opinion; International Application No. PCT/US2010/051532; Dec. 1, 2010; 10 pages; International Searching Authority / United States; Commissioner of Patents; Alexandria, Virginia.
International Preliminary Report on Patentability; International Application No. PCT/US2010/051532; Dated Jan. 25, 2012; 13 pages; The International Bureau of WIPO, Geneva, Switzerland.

* cited by examiner

*Primary Examiner* — Kaj K Olsen
*Assistant Examiner* — Ross J Christie
(74) *Attorney, Agent, or Firm* — Murabito Hao & Barnes LLP; Andrew D. Fortney

(57) ABSTRACT

Zinc clays, methods for preparation of zinc clays, and compositions containing the same are disclosed. The methods comprise mixing a clay with a zinc ammonia complex solution to prepare the zinc clays. Zinc clays according to the present invention may further comprise quaternary ammonium salts. The present clays may be used in compositions and/or as additives in rubber and plastic formulations and products, as nutrient delivery agents, and in catalyst formulations.

33 Claims, No Drawings

ZINC CLAYS, ZINC ORGANOCLAYS, METHODS FOR MAKING THE SAME, AND COMPOSITIONS CONTAINING THE SAME

FIELD OF THE INVENTION

The present invention generally relates to the field of zinc clays, methods for making zinc clays and zinc organoclays, and various applications of such zinc clays, including applications in rubber and other polymer materials and the like, in which the zinc clays function, e.g., as one or more of an anti-reversion agent, a vulcanization activator and/or accelerator, a rheology modifying agent, a filler and/or a reinforcing agent for rubber or plastics (especially in tires). Zinc clays of the present invention may also be used as carriers of nutrients and in catalyst formulations.

DISCUSSION OF THE BACKGROUND

Zinc compounds, zinc clays and other additives can be used in rubber compounding (e.g., in the manufacture of tires) to obtain desired properties in a finished rubber product. For example, when a rubber product is mixed and formed (e.g., in a mold), it is typically heated in a curing process (i.e., for a length of time and/or at a temperature sufficient to effect such curing). Careful control of process conditions in such a curing process is essential to impart one or more desired characteristics to a cured rubber product. However, in the case of large and/or thick rubber products (e.g., tires), heat transfer to the rubber product during curing may be non-uniform throughout the rubber material due to the heat transfer characteristics of the material being cured (i.e., longer times are necessary for heat transfer to the center of the material from the surface of a mold). This may result in an uneven curing process (e.g., over-cured surface regions relative to the center of the material), yielding a product with undesirable characteristics resulting from such over-curing at a surface of a rubber product, a phenomenon commonly referred to as reversion. Such an over-cured surface region may have a lower hardness, elastic modulus, abrasion resistance, etc. There are a number of products available to correct this problem, such as Perkalink 900 (Flexsys NV, Belgium).

There have been efforts to use zinc montmorillonite clay to replace zinc oxide in rubber compounding to reduce the amount of zinc oxide used in such rubber compounds for both environmental and economic reasons. Such zinc montmorillonite clays are usually made by mixing sodium montmorillonite with zinc chloride to exchange zinc ions with sodium ions in the clay (e.g., as described in PCT/NL2003/000880, the relevant portions of which are incorporated herein by reference). The clay is then washed free of sodium chloride and excess zinc chloride, then dried and milled to form a zinc clay suitable for use as rubber activator. However, such processes typically require a large number of washing steps. In addition, the dried zinc clay product is often extremely hard, and consequently, very difficult to mill into a fine powder suitable for use in rubber compounding. Furthermore, the zinc content of clays produced by such conventional processes is usually very low, with a typical maximum zinc content of less than 5%.

Precipitated silica, carbon black, calcium carbonate, and clay are also used in rubber products to reduce cost and/or impart special properties such as lower rolling resistance for tires, higher modulus, etc. Precipitated silica is preferred over carbon black for lower rolling resistance. Calcium carbonate and clay are preferred additives for cost advantages, as they are natural products and typically require less energy to make. However, their use is limited as they may also result in undesired effects such as lower hardness and modulus in certain cases.

Organoclays may also used in rubber and plastic compositions as fillers. These organoclay fillers are usually made from smectic clays such as calcium montmorillonite, sodium montmorillonite, saponites, nontronites, beidellites, hecorites, etc. These minerals in turn are dominant parts of bentonite rock. Such clays may be treated with acid, then washed free of the acid and other soluble matter, then converted to their corresponding sodium salts by treatment with soda ash or caustic soda. In one process, a sodium montmorillonite clay is then reacted with quaternary ammonium chloride salts (e.g., dimethyldi(hydrogenated tallowalkyl) ammonium chloride) or amines (e.g., laurylamine or tallowalkylamine) and their salts to form an organoclay. The quaternary ammonium salt intercalates between platelets and/or layers of the clay, helping to expand the interlayer distance in the clay to about 20 angstroms or more. Such intercalation into the clay platelets results in easier exfoliation of the clay during rubber compounding or plastic processing. The exfoliation aids in dispersal of the nanoscale platelets from the clay into various compositions, and imparts various properties like higher hardness, modulus, heat resistance, etc. to products containing such intercalated clays.

SUMMARY OF THE INVENTION

Embodiments of the present invention relate to zinc clays, methods of making zinc clays and zinc organoclays, and various applications of such zinc clays, including applications in rubber and other polymer materials and the like, in which the zinc clay functions, e.g., as one or more of an anti-reversion agent, a vulcanization activator and/or accelerator, a rheology modifying agent, a filler and/or a reinforcing agent for rubber or plastics (especially in tires). Zinc clays of the present invention may also be used as carriers in nutrient compositions and in industrial catalyst formulations.

In some embodiments, the present invention provides methods for making zinc clays by mixing a clay with a zinc ammonia carbonate complex solution to form a zinc clay, then filtering the mixture to isolate the zinc clay, and drying the isolated zinc clay. Such methods may reduce and/or eliminate washing steps common in conventional methods of making zinc clays using zinc chloride, and provide a zinc clay having a higher zinc content relative to zinc clays produced by conventional methods.

In other embodiments, the present invention provides a zinc clay having a zinc ion content from about 1 wt % to about 12 wt % or more. Zinc clay according to the present invention may be easier to mill or to break up into fine powder relative to zinc clays produced by conventional methods. Furthermore, zinc clays of the present invention may have a zinc ion content (e.g., a content of zinc ions chemically bound to the clay and substantially insoluble in an aqueous solution comprising ammonia and carbon dioxide, or aqueous ammonium carbonate) that is higher than conventional zinc clays.

In additional embodiments, the present invention provides zinc organoclays comprising one or more ammonium salt(s) and methods of making zinc clays comprising one or more ammonium salt(s). Such zinc organoclays comprising ammonium salts may be easier to exfoliate during mixing and/or processing steps, enabling easier separation of the layers and/or platelets of the clay, and rendering various beneficial properties like higher hardness, modulus, reversion resistance, heat resistance, etc. to products made from compositions containing the same.

In additional embodiments, the present invention provides compositions comprising a rubber and zinc clays and/or zinc organoclays according to the present invention. The present zinc clays and zinc organoclays comprise mostly natural products, and may provide performance and/or impart such special properties equal to or better than conventional additives (e.g., precipitated silica or carbon black) for certain rubber products. In addition, it is has been determined that the present zinc clays and zinc organoclays unexpectedly provide reversion reduction during rubber vulcanization. The present zinc clays and zinc organoclays may also be useful as fillers and/or reinforcing agents in polymers such as rubber and plastic. They may also find application as carriers of plant and animal nutrients, in paint formulations, and in catalyst formulations (as described in U.S. Pat. Nos. 3,902,886 and 5,898,089, the relevant portions of each of which are incorporated herein by reference).

These and other advantages of the present invention will become readily apparent from the detailed description of preferred embodiments below.

DETAILED DESCRIPTION

Reference will now be made in detail to various embodiments of the invention. While the invention will be described in conjunction with the disclosed embodiments, it will be understood that they are not intended to limit the invention. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent that the present invention may be practiced without these specific details. In other instances, well-known methods, procedures and/or components have not been described in detail so as not to unnecessarily obscure aspects of the present invention.

The invention, in its various aspects, will be explained in greater detail below with regard to exemplary embodiments.

Exemplary Methods for Preparation of Zinc Clays

In one preferred method for preparing zinc clays, a clay is mixed with a zinc ammonia carbonate complex solution to form a zinc clay suspension. The clay may be a cation-exchangeable clay such as a bentonite-derived clay, calcium montmorillonite, synthetic montmorillonite, sodium montmorillonite, a zeolite, a saponite, a nontronite, a beidellite, a hecorite, a vermiculite, a swellable mica or a mixture thereof. The clay may be essentially any clay suitable for use according to the present invention, typically a clay having a suitable cation exchange capacity for binding of zinc ions. The clay may be selected according to its cation exchange capacity to afford a desired zinc content of a product zinc clay. The clay may be ground or milled prior to mixing with the zinc ammonia complex solution to form the zinc clay suspension. The clay may also be graded or screened after grinding or milling and prior to mixing to remove coarse components.

In some embodiments, the clay is mixed with water to form a slurry prior to mixing with a zinc ammonia carbonate complex solution. The clay may be ground prior to mixing with water to form the slurry. The slurry may subsequently be degritted by, for example, filtering through a mesh screen or by passing through a hydrocyclone with an appropriate cone size to remove undesired coarse components of the clay before mixing with the zinc ammonia complex solution. The mesh of the screen may be essentially any mesh size that removes undesired coarse components of the clay. In one exemplary embodiment, the screen is a 325 mesh screen. The ratio of clay to water in the slurry may be, for example, 1:100 to 1:10 wt:vol, preferably 1:20 to 1:14 wt:vol. However, the ratio of clay to water is not limited, and essentially any suitable ratio may be employed in the preparation of the slurry. In an exemplary embodiment, the clay to water ratio is 1:15 wt:vol.

In other embodiments, the slurry may be treated with base to adjust the pH of the slurry prior to mixing with the zinc ammonia carbonate complex solution. The pH of the slurry may be adjusted to a pH $\geq 8$, 9, 10 or higher. The base may be essentially any water-soluble base, such as ammonia, an alkali hydroxide (e.g., sodium hydroxide) and/or solutions thereof, or any base (or solution thereof) that does not substantially interfere with the formation of the present zinc clay. In one exemplary embodiment, the pH of the slurry is adjusted with ammonia or with aqueous ammonium hydroxide to about 10.

In still another embodiment, the clay is washed with an acid before forming a slurry, either after an initial treatment with base described above, or by direct acidification of a native clay. In either case, the clay is acidified prior to adding the clay to the zinc ammonia carbonate complex solution. The acidity of the clay (or a slurry thereof) may be adjusted to a pH of $\leq 4$, 3, 2 or lower. The acid may be essentially any water-soluble acid, e.g., a mineral acid. In some embodiments, the acid comprises an aqueous solution of hydrochloric or sulfuric acid. The acid solution may have any suitable concentration sufficient to acidify the clay to a desired level. In one exemplary embodiment the acid solution is saturated aqueous hydrochloric acid (~35%). In another embodiment, the acid comprises an aqueous sulfuric acid solution. The clay may then be washed with water until substantially free of the acid, generally until a pH of the filtrate is $\geq 4$, 4.75 or higher. In one embodiment, the acidified clay is optionally converted to its alkali salt form (e.g., sodium salt) by mixing with soda ash or sodium hydroxide (or solutions thereof). In another embodiment, the acidified clay is neutralized and the pH thereof adjusted to a pH $\geq 8$, 9, or higher with a base (or a solution thereof) as described above. The native, acid-washed, acid/base-washed, or base-washed clay may be further dried and milled prior to mixing with the zinc ammonia carbonate complex solution.

The zinc ammonia carbonate complex solution comprises a zinc ammonia carbonate complex, and may be prepared as described in co-pending U.S. patent application Ser. No. 11/519,949 (filed Sep. 11, 2006) and co-pending U.S. patent application Ser. No. 12/346,535 (filed Dec. 30, 2008), each of which is incorporated herein by reference in their entirety. The zinc ammonia carbonate complex solution can optionally be replaced with a solution of other zinc ammine salts, like zinc ammine chloride, zinc ammine sulfate, etc., or a mixture thereof. The zinc ammine salt may comprise a compound of the formula $Zn(NH_3)_2X_n$, where n is 1 or 2, and when n=2, X is F, Cl, Br, I, $NO_3$, CN, OCN, CNO, NCO, or $CO_2CH_3$, and when n=1, X is $SO_4$, $HPO_4$, or $CO_3$. Of course, other monovalent and/or divalent anions compatible with the present methods are also suitable. The native, acid-washed, acid/base-washed, or base washed clay or a slurry thereof may then be combined with the zinc ammonia carbonate complex solution to form a zinc clay suspension. Typically, the zinc ammonia carbonate complex solution is added to the clay slurry. In embodiments where dry clay is combined with the zinc ammonia carbonate complex solution, the dry clay may be added to the zinc ammonia carbonate complex solution. The suspension is mixed and maintained under heavy mixing or agitation for a length of time sufficient to allow for absorption of zinc ions by the clay. In a typical embodiment, the suspension is mixed for 6 hours or more. The mixing and/or agitation time is not particularly limited, and may be carried out for a length of time sufficient to effect a desired zinc ion content of the product zinc clay up to its maximum cation exchange capacity. Then suspension may then optionally be milled with a suitable wet milling device such as an attritor for a length of time sufficient to provide a particular particle size and/or homogeneity of the suspension. Milling may also be performed with a plugmill or a Manton-Gaulin homogenizer (as mentioned in U.S. Pat. No. 5,110,501, the relevant portions of which are incorporated herein by reference). In a typical embodiment, the suspension is milled in an attritor for two hours after mixing. The mixture may optionally be heated after the absorption of zinc ion. Heating is preferably conducted at a temperature of from about 50° C. to about 150° C. If desired, the mixture may then be cooled to a temperature of from about 15° C. to about 30° C.

The suspension may then be filtered, for example, by vacuum filtration. In one embodiment, the retained filter cake may then be dried directly and milled, leaving excess zinc (if any) as zinc oxide and/or zinc carbonate in the zinc clay powder. In some embodiments, the filter cake is washed to remove excess zinc. The washing fluid comprises water and ammonia and/or carbon dioxide, or mixtures thereof. The concentration of ammonia and/or carbon dioxide in the washing solution is not particularly limited. Essentially any concentrations ammonia and/or carbon dioxide may be selected that are effective in removing excess zinc from the filter cake. Washing may be conducted until essentially all ammonium carbonate solution-soluble zinc in the filter cake has been extracted, until a zinc content in the filtrate reaches a desired level (e.g., less than 0.5%). The filtrate comprising ammonia, carbon dioxide and/or recovered zinc may be reused and/or recycled to make zinc ammonia carbonate complex solution. Alternatively, zinc and/or ammonia may be recovered from the filtrate by boiling and distillation as described in co-pending U.S. patent application Ser. No. 11/519,949 (filed Sep. 11, 2006).

The filter cake may then be further washed with water or dried, preferably at a temperature of from about 50° C. to about 200° C. Drying may be conducted for a length of time sufficient to reduce a moisture content of the zinc clay to a desired level, such at less than 1%, less than 0.5% or lower. In some embodiments, the filter cake is then calcined at a temperature of $\geq 200°$ C., 250° C. or greater, for a length of time sufficient to effect complete drying of the zinc clay. If desired, the zinc clay product may then be milled to a powder. The milled powder may be further refined by e.g., screening with a mesh screen of suitable gauge to achieve a desired maximum particle size in the milled zinc clay.

Exemplary Zinc Clays

Zinc clays according to embodiments of the present invention contain cation exchangeable clays such as bentonite-derived clays, calcium montmorillonite, sodium montmorillonite, synthetic montmorillonite, zeolites, saponites, nontronites, beidellites, hecorites, vermiculites, swellable micas or mixtures thereof. The clay may be essentially any clay suitable for use according to the present invention, typically a clay having a suitable cation exchange capacity (e.g., of from about 50 to about 150 meq/100 gram of clay) for binding of zinc ion. The clay may be selected according to its cation exchange capacity to afford a desired zinc content of a product zinc clay.

The zinc ion concentration in a washed product zinc clay may be from about 1 wt % to about 12 wt % or higher. Zinc ions in the present zinc clays are at least partially chemically bound to the clay, and are at least partially insoluble in an aqueous solution comprising ammonia and carbon dioxide or ammonium carbonate. In various embodiments, the zinc ion concentration is 5-12 wt % or higher. Zinc clays produced according to embodiments where a product zinc clay is not washed, leaving excess zinc as e.g., zinc oxide and/or zinc carbonate, may have a zinc concentration from about 8 wt % to about 70 wt % of the product zinc clay. Zinc clays according to the present invention may have a milled powder bulk density of from about 0.5 to about 0.8 g/cm$^3$, a true density of about 2.5 g/cm$^3$ to about 3.0 g/cm$^3$, and/or a $D_{001}$ interlayer spacing of from about 10 to about 15 Angstroms.

Methods for Preparation of Zinc Organoclays

In some embodiments, zinc clays prepared according to the methods previously described may be reslurried in water. As described above, the relative ratio of clay to water is not particularly limited. One or more quaternary ammonium salts may then be added to the zinc clay slurry. The quaternary ammonium salts may include ester quaternary ammonium salts, alkoxy alkyl quaternary ammonium salts, trialkyl monomethyl quaternary ammonium salts, dialkyl dimethyl quaternary ammonium salts. The ammonium salt may comprise one or more compounds of the formula $R_4NX$, where each instance of R is independently hydrogen, tallow (e.g., a mixture of saturated, monounsaturated and polyunsaturated $C_{12}$-$C_{24}$ carboxylic acid moieties, in the form of $C_xH_y(CO)$— groups, where x is from 11 to 23 and y is from 2x−5 to 2x+1), or $C_1$-$C_{24}$ alkyl, $C_2$-$C_{24}$ alkenyl, $C_6$-$C_{20}$ aryl, $C_7$-$C_{20}$ aralkyl, mono- or dialkyaminoalkylene, $C_2$-$C_{24}$ hydroxyalkyl, (CO)R$^2$, or (CO)OR$^2$, where R$^2$ is $C_1$-$C_{24}$ alkyl, $C_2$-$C_{24}$ alkenyl, $C_6$-$C_{20}$ aryl, or $C_7$-$C_{20}$ aralkyl, and X is a halide, sulfate, nitrate, cyanide cyanate, isocyanate or a carboxylate (e.g., an acetate). Exemplary salts include (but are not limited to) methyl tallow bis-2-hydroxyethyl ammonium chloride, methyl tallow bis-2-hydroxyethyl ammonium sulfate, dimethyl hydrogenated tallow (2-ethylhexyl) ammonium salts, dimethyl hydrogenated tallow ammonium salts, dimethyl tallowalkyl octyl ammonium methyl sulfate, dimethyl di(hydrogenated tallow alkyl) ammonium chloride, methyl trialkyl ammonium chloride, trimethyl alkyl ammonium chloride, dimethyl dialkyl ammonium chloride, dimethyl alkyl allyl ammonium chloride, dimethyldiallyl ammonium chloride, dimethyl di(hydrogenated tallow) ammonium chloride, hydrogenated tallow alkyl(2-ethylhexyl)dimethyl ammonium methylsulfate, diester quaternary ammonium compound, trimester, monoester, dialkyl dimethyl ammonium chloride, and bis-(hydrogenated tallow) dimethyl ammonium chloride. The quaternary ammonium salts may be added directly, or as an aqueous solution thereof. The mixture of the ammonium salts and the zinc clay may then mixed in e.g., in an attritor for a length of time sufficient to homogenize the mixture. In a typical implementation, the mixture is run through an attritor for 2 hours.

In an alternate embodiment, the quaternary ammonium salts can be generated in situ by adding one or more amines (or a solution thereof) to the reslurried zinc clay, then converting the amine(s) to the corresponding ammonium salt(s) by treating the zinc clay-amine mixture with an acid (or solution thereof). Suitable acids include mineral acids like hydrochloric or sulfuric acid. Suitable amines include primary, secondary or tertiary amines. Suitable amines may comprise one or more compounds of the formula $R_3N$, where each instance of R is independently hydrogen, tallow (e.g., a mixture of $C_{12}$-$C_{20}$ alkyl, $C_{11}$-$C_{23}$(CO) and alkylenyl groups), $C_1$-$C_{24}$ alkyl, $C_2$-$C_{24}$ alkenyl, $C_6$-$C_{20}$ aryl, $C_7$-$C_{20}$ aralkyl, mono- or dialkylaminoalkylene, $C_1$-$C_{24}$ hydroxyalkyl, (CO)R$^2$, or (CO)OR$^2$, where R$^2$ is $C_1$-$C_{24}$ alkyl, $C_2$-$C_{24}$ alkenyl, $C_6$-$C_{20}$ aryl, or $C_7$-$C_{20}$ aralkyl. Exemplary amines include (but are not limited to) laurylamine, methylamine, ethylamine, butylamine, dimethylamine, diethylamine, propylamine, dipropylamine, methylbutylamine, dialkylaminoalkylamine, ethylene diamine, stearylamine, or tallow amine. After addition of the ammonium salt(s), or alternatively, addition of the amine(s) and in situ generation of the corresponding ammonium salt(s), the ammonium salt-containing mixture may then be mixed, washed, dried, filtered and/or milled as previously described.

Exemplary Zinc Organoclays

Zinc organoclays according to embodiments of the present invention may contain smectic clays as previously described. The clay may be essentially any clay suitable for use according to the present invention. Zinc organoclays produced according to the methods previously described may have a zinc concentration from about 3 wt % to about 50 wt % of the product zinc organoclay. Zinc organoclays further contain one or more quaternary ammonium salts as previously described, intercalated between the clay platelets. The amount of ammonium salt(s) present is not particularly limited, and may be selected to provide a desired degree of intercalation based on a target application and/or target properties of a product zinc clay. In exemplary embodiments, the ammonium salt(s) are present in amounts of from 0.1 wt % to 50 wt % of the zinc organoclay, or any value therein.

Zinc organoclays according to the present invention may have a milled powder bulk density of from about 0.3 to about 0.6 g/cm$^3$, a true density of about 1.5 g/cm$^3$ to about 2.5 g/cm$^3$, and display a $D_{001}$ interlayer spacing of from about 20 to about 40 Angstroms. The larger $D_{001}$ interlayer spacing of the present zinc organoclays provide easier exfoliation of the clay during mixing and/or processing steps, resulting in easier separation of the layers and/or platelets of the clay and better mixing of the clay in a composition containing the same.

Exemplary Compositions Containing a Zinc Clay or a Zinc Organoclay

Zinc clays and zinc organoclays according to the various methods described above can further processed into compositions such as rubber master batches comprising 5 to 70 wt % zinc clay or zinc organoclay, with or without added ammonium salts. The compositions may comprise natural or synthetic rubber, processing aids, zinc oxide, etc. In some embodiments, 7 parts per hundred (phr) of a zinc clay or a zinc organoclay according to the present invention is added to 48.5 phr of carbon black, 100 phr of natural rubber STR 5L, 4 phr of an aromatic oil, 2 phr of stearic acid, and 1 phr of Santoflex PPD. The relative amounts and/or type of additives may be selected according to the desired characteristics of the compositions. The compositions may be prepared by mixing the zinc clay or zinc organoclay, rubber, and other additives to impart special properties and/or other desired characteristics to the composition (where applicable) in a Banbury-type mixer at a shear force and for a length of time sufficient to exfoliate the zinc clay and provide a sufficient degree of mixing. Quaternary ammonia salts as described above may also be added to the composition at this stage. Compositions as described may be used to make finished products like tires, belts, rubber sections, rollers, etc. Furthermore, compositions according to the present invention may be employed as carriers in nutrient compositions and/or as supports or activators in a catalyst system.

The following examples will further illustrate the present invention.

EXAMPLES

For the following examples, materials are obtained from the following sources:
Bentonite clay Pc7—a reportedly sodium activated calcium bentonite clay consisting of over 80% montmorillonite with CEC (cation exchange capacity) over 100 meq/100 grams, supplied by Volclay Siam Co. Ltd, Thailand.
Adogen 464—tri-alkyl methyl ammonium chloride from Aldrich Chemicals, USA.
Dodecylamine—Sigma-Aldrich Chemicals, USA.

Testing methods and equipment include:
Cure characteristics—ASTM D2084, Oscillating Disk Rheometer, Monsanto.
Mooney viscosity—ASTM 1646.
Sample Curing—compression moulding.
Hardness—ASTM D2240.
Tensile & modulus—ASTM D412.
Heat buildup—ASTM D623.
Rubber Process Analyzer (RPA 2000, Alpha Technology) for G' (elastic modulus) and Tan delta (ratio of viscous modulus to elastic modulus).
Abrasion—DIN 53 516.
Reversion—DIN 53 529.
Attritor—Union Process Inc., Akron, Ohio.
D-Spacing—X-ray diffractometer, Rigaku TTRAX 111.

Example 1

Preparation of Zinc Clay R01

Bentonite Pc7 (783 g) was mixed with 15 liters of water and degritted with a 325 mesh screen. Zinc ammonia carbonate complex solution (2,326 g) containing 10.03% zinc, 11.2% ammonia, and 6.96% carbon dioxide was added with agitation. The mixture was agitated for 12 hours, then run through an attritor for 2 hours. The slurry was vacuum filtered, and the filter cake washed with 10 liters of ammonia/carbonate solution until zinc content of the filtrate was 0.66% or less. The filter cake was dried at 150° C. for 18 hours until the moisture content was 0.25%. The dried powder was milled with an attritor for one hour, then the fines were sieved with a 325 mesh screen to obtain a zinc clay with the following properties:

|  | Zinc Clay R01 |
| --- | --- |
| Bulk Density, gr/cc | 0.74 |
| pH | 9.78 |
| Zinc (wt %) | 8.7 |
| $D_{001}$ Spacing, Angstroms | 12.6 |

The amount of zinc at 8.73% was significantly higher than a zinc clay obtained via a conventional zinc chloride process (e.g., as described in PCT/NL2003/000880, the relevant portions of which are incorporated herein by reference). The present zinc clay RO1 was also softer and easier to mill.

Example 2

Preparation of Zinc Clay R02

Bentonite Pc7 (3,000 g) was mixed with 45 liters of tap water and degritted with a 325 mesh screen. Sulfuric acid (16.7%, 800 g) was slowly added with agitation until the pH of the solution was about 2. The acidified slurry was then agitated for 24 hours. The slurry was then vacuum filtered, and the filter cake washed with 120 liters of water. The filter cake was then reslurried and the pH was adjusted to about 8.15 with ammonia. Zinc ammonia carbonate complex solution (11,325 g) with 8.83% zinc was then added with agitation. The mixture was agitated for 12 hours, then put it through an attritor for 2 hours. The resulting slurry was then filtered, and the filter cake washed with 20 liters of ammonia/ carbonate solution until filtrate contained 0.24% zinc. The filter cake was then dried at 150° C., milled with an attritor, and run through a classifier to separate the coarse material. A zinc clay was obtained that exhibited the following properties:

|  | Zinc Clay R02 |
| --- | --- |
| Bulk Density, (g/cm$^3$) | 0.57 |
| pH | 8.66 |
| Zinc (wt %) | 10.86 |
| $D_{001}$ Spacing, Angstroms | 12.6 |
| True Density (g/cm$^3$) | 2.61 |

Example 3

Preparation of Zinc Clay R03

Bentonite Pc7 (500 g) was mixed with 7,500 grams of water and degritted with a 325 mesh screen. $H_2SO$ (1:5, 150 g) was added with agitation to a pH of 2. The mixture was then agitated for 6 hours. The slurry was filtered, then washed with 25 liters of water until the filtrate pH was 4.41. The filter cake was then reslurried and the pH of the slurry was adjusted with ammonia to 10.11. Zinc ammonia carbonate complex solution (653 g, 9.19% zinc) was then added. The slurry was then run through an attritor for two hours, then vacuum filtered. The filter cake was washed with 4,000 ml of ammonia/carbonate solution until the percentage of zinc in the filtrate was 0.27%. The filter cake was then reslurried to form a solution with a solid content of 10.78%. Adogen 464 (86 g) was added to 1,855 g of the slurry, and the mixture run through an attritor for two hours. The slurry was then filtered and the filter cake was dried at 70° C. until the moisture content was 0.54% or less. The product was then milled with an attritor for two hours and sieved with a 325 mesh screen to remove coarse material, yielding a zinc clay with the following properties:

|  | Zinc Clay R03 |
| --- | --- |
| Bulk Density (g/cm$^3$) | 0.34 |
| pH | 8.32 |
| Zinc (wt %) | 7.19 |
| $D_{001}$ Spacing, Angstroms | 25.37 |

Example 4

Preparation Zinc Clay R04

Bentonite Pc7 (132 g) was mixed with 2,000 grams of water and degritted with a 325 mesh screen. Zinc ammonia carbonate complex solution (157 g, 8.9% zinc) was then added. The slurry was run though an attritor for two hours, and then vacuum filtered. The filter cake was then washed with 2,000 ml of ammonia/carbonate solution until the zinc content of the filtrate was 0.16% or less. The filter cake was reslurried, and 49 grams of dodecylamine were added. The slurry was then run through an attritor for two hours. Hydrochloric acid (35%, 21.5 ml) was then added to the slurry. The slurry was filtered, and the filter cake washed with 4000 ml of water until the conductivity of the filtrate was 2060×10$^{-3}$ mho/cm. The filter cake was then dried at 110° C. until the moisture content was 0.4% or less. The product was then milled with an attritor for two hours, then sieved with a 325 mesh screen to remove coarse material, yielding a zinc clay with the following properties:

|  | Zinc Clay R04 |
| --- | --- |
| Bulk Density (g/cm$^3$) | 0.45 |
| pH | 8.68 |
| Zinc (wt %) | 6.72 |
| $D_{001}$ Spacing, Angstroms | 28.6 |

Example 5

Preparation of Zinc Clay R05

A zinc clay as described in Example 2 with a zinc content of 8.48% was prepared.

A solution of 223 grams of Adogen 464 in 225 grams of water was then sprayed onto 671 grams of the clay and the mixed. The mixture was dried at 70° C. for 22 hours until the moisture content was less than 0.5%. The product was milled with an attritor for two hours, then sieved with a 200 mesh screen to remove coarse material, yielding a zinc clay with the following properties:

|  | Zinc Clay R05 |
| --- | --- |
| Bulk Density (g/cm$^3$) | 0.51 |
| pH | 7.94 |
| Zinc (wt %) | 6.78 |
| $D_{001}$ Spacing, Angstroms | 32.1 |
| True Density (g/cm$^3$) | 1.84 |

The zinc clay can be first produced and dried at much higher temperatures without affecting the quaternary ammonium chloride salt, which is easily dried at lower temperature after spraying to make zinc organoclay. A similar zinc organoclay containing an ammonium salt can also be produced from a zinc clay obtained via a conventional zinc chloride using this method.

Example 6

Preparation Organoclay R06

Bentonite Pc7 (200 gr) was mixed with 3 liters of water and degritted with a 325 mesh screen. Adogen 464 (76 g) was then added to the slurry, and the mixture was milled with an attritor for two hours. The mixture was then filtered, and 1500 g of filter cake was obtained. The filter cake was dried at 70° C. for 48 hours. The dried product was milled with an attritor for two hours, then sieved with a 325 mesh screen to remove coarse material, yielding an organoclay with the following properties:

|  | Organoclay R06 |
| --- | --- |
| Bulk Density (g/cm$^3$) | 0.45 |
| pH | 9.66 |
| Zinc (wt %) | 0 |
| $D_{001}$ Spacing, Angstroms | 25.7 |
| True Density (g/cm$^3$) | 1.78 |

Example 7

Preparation of Zinc Clay R07 and Zinc Organoclay R08

Bentonite PC7 (1500 g) was added to 22 liters water, agitated and degritted by sieving through a 325 mesh screen. The pH of the slurry was adjusted to 2.18 with sulfuric acid (1:5, 450 grams), then filtered. The filter cake was then washed with a total of 52 liters of water until the filtrate pH was 4.78. The filter cake was then reslurried and the pH adjusted to 10.81 with ammonia. Zinc ammonia carbonate complex solution (11.8 kg, 8.73% zinc, 11.25% ammonia, and 5.12% carbon dioxide) was then added, and the mixture was then agitated for 12 hour, followed by and attrition milling for 2 hours. The slurry was then boiled at 80 to 100° C. adding more water as necessary during the boiling process, then filtered until the filtrate contained 0.2% zinc. The filter cake was then dried at 150° C. for 48 hours, affording 2.9 kg of dry solid. A portion of the dry solid (900 g) was then calcined at 250° C., yielding 820 grams of calcined solid. The calcined solid was then attrition milled and sieved through a 325 mesh screen to obtain 800 grams of zinc clay R07.

Zinc clay R07 (200 g) was then sprayed with 36.4 grams of Adogen 464 in 110 grams of water and mixed. The mixture was then attrition milled, dried at 70° C. for 18 hours and then attrition milled it again. The resultant material was then sieved through a 325 mesh screen to obtain zinc clay R08. Zinc clays R07 and R08 displayed the following properties:

|  | Zinc Clay R07 | Zinc Organoclay R08 |
|---|---|---|
| Bulk Density (g/cm$^3$) | 0.61 | 0.54 |
| pH | 8.1 | 7.74 |
| Zinc (wt %) | 44.16 | 36.61 |
| $D_{001}$ Spacing, Angstroms | 12.4 | 29.0 |

For the following examples, carbon black, silica (if any), PEG (if any), processing oil, stearic acid, and antioxidant are added in sequence as listed at a 3 liter Banbury mixer with blades rotating at 50 rpm with heating rising gradually from about 80° C. to about 140° C. over 11.5 minutes in a first stage mixing. In a second stage mixing, zinc oxide, rubber accelerators, and sulfur are mixed at a two roll mill. There are four first stage mixing methods AA, BB, CC, and DD as shown below:

|  | Mixing Time (min) | | | |
|---|---|---|---|---|
| Mixing method | AA | BB | CC | DD |
| Rubber | 0.5 | 0.5 | 0.5 | 0.5 |
| Added Clay | 2 | none | 2 | 2 |
| Carbon Black | 6 | 4 | 1.5 | 6 |
| Silica | — | 4 | 4 | — |
| PEG | — | with silica | with silica | with carbon black |
| Processing Oil (stearic acid, 6 PPd) | 3 | 3 | 3 | 3 |
| Total Time (min) | 11.5 | 11.5 | 11.5 | 11.5 |

Example 8

Preparation of Tire Tread Formulations

Tire tread formulations were mixed in two stages. The first stages consisted of ingredients as shown below:

| Recipe | 8A | 8B | 8C | 8D | 8E | 8F |
|---|---|---|---|---|---|---|
| Mixing method | AA | AA | AA | AA | AA | AA |
| Natural rubber, STR 5 L | 100 | 100 | 100 | 100 | 100 | 100 |
| Carbon Black N330 | 48.5 | 48.5 | 48.5 | 48.5 | 48.5 | 48.5 |
| Silica VN3 | — | 7 | — | — | — | — |
| Zinc clay, R02 | — | — | 7 | — | — | — |
| Zinc clay, R05 | — | — | — | 7 | — | — |
| Zinc clay, R03 | — | — | — | — | 7 | — |
| Organoclay, R06 | — | — | — | — | — | 7 |
| Aromatic oil | 4 | 4 | 4 | 4 | 4 | 4 |
| Stearic acid | 2 | 2 | 2 | 2 | 2 | 2 |
| Santoflex 6PPD | 1 | 1 | 1 | 1 | 1 | 1 |

In a second stage, 4 phr of white seal zinc oxide was then added to each formulation in a two roll mill at 100° C. rotor temperature over 3.5 minutes. Then 2 phr of accelerator TBBS and 2 phr of sulfur were added to each formulation at 70 to 80° C. rotor temperature over 3 minutes. The formulations were then cured at 160° C. for 20 minutes, yielding tread compositions with the following characteristics:

|  | control | | invention | | invntn | control |
|---|---|---|---|---|---|---|
| Recipe | 8A | 8B | 8C | 8D | 8E | 8F |
| Hardness, shore A | 67.7 | 69.4 | 67.7 | 71 | 72.2 | 71.9 |
| 100% modulus, MPa | 3.23 | 3.6 | 3.99 | 4.83 | 4.73 | 4.54 |
| 200% modulus,, MPa | 9.47 | 10.28 | 11.11 | 13.15 | 12.53 | 12.33 |
| Tensile strength, MPa | 23.7 | 24.3 | 22.5 | 23.6 | 23.2 | 23.3 |
| Elongation at break, % | 373 | 392 | 344 | 314 | 324 | 326 |
| Abrasion, DIN Vol loss mm$^3$ | 109 | 119 | 123 | 125 | 128 | 135 |
| Reversion, %, DIN 53 529 | 13.98 | 21.67 | 16.12 | 9.17 | 10.73 | 15 |

Recipes 8C, 8D and 8E prepared with zinc clays R02, R05 and R03 respectively exhibited higher hardness and moduli. The reversion resistance of the recipes with the present zinc clays was also improved relative to recipes without the present zinc clays.

Example 9

Preparation of Tire Tread Formulations

Tire tread formulations were mixed in two stages. The first stage consisted of ingredients as shown below:

| Recipe | 9A | 9B | 9C | 9D |
|---|---|---|---|---|
| Mixing method | BB | CC | DD | DD |
| Natural rubber, STR 5 L | 100 | 100 | 100 | 100 |
| Zinc clay R02 | — | 7 | 22 | — |

-continued

| Recipe | 9A | 9B | 9C | 9D |
|---|---|---|---|---|
| Zinc organoclay R05 | — | — | — | 22 |
| Carbon Black N330 | 34.5 | 34.5 | 34.5 | 34.5 |
| pp silica, VN3 | 17 | 11 | — | — |
| PEG 4000 | 2 | 2 | 2 | 2 |
| Aromatic oil | 4 | 4 | 4 | 4 |
| Stearic acid | 2 | 2 | 2 | 2 |
| Santoflex 6 PPD | 1 | 1 | 1 | 1 |

In a second stage, 4 phr of white seal zinc oxide was then added to each of formulations 9A and 9B, and 3 phr of white seal zinc oxide was added to each of formulations 9C and 9D in a two roll mill at 100° C. rotor temperature over 3.5 minutes. Then 2.5 phr of accelerator TBBS and 2.5 phr of sulfur were added to each formulation at 70 to 80° C. rotor temperature over 3 minutes The formulations were then cured at 160° C. for 20 minutes, yielding tread compositions with the following characteristics:

| | control | | invention | |
|---|---|---|---|---|
| Recipe | 9A | 9B | 9C | 9D |
| Hardness, shore A | 62.9 | 62.7 | 65 | 68.4 |
| 100% modulus, MPa | 2.22 | 2.32 | 2.92 | 3.52 |
| 200% modulus, MPa | 5.48 | 5.73 | 6.67 | 8.08 |
| Tensile strength, MPa | 22 | 23 | 19.5 | 20.9 |
| Elongation at break, % | 492 | 487 | 402 | 394 |
| Abrasion, DIN Vol loss mm$^3$ | 150 | 147 | 156 | 166 |
| Mooney viscosity (ML 1 + 4 @ 100° C.) | 66.6 | 61.3 | 59 | 51.7 |
| Max Torque, lbs-in | 44.9 | 44.73 | 45.33 | 44.5 |
| Torque at 70 min, lbs-in | 35.53 | 35.63 | 38.5 | 39.9 |
| Reversion, % DIN 53 529 | 26.48 | 26.58 | 18.66 | 12.89 |

Recipes 9B, 9C and 9D prepared with zinc clays R02 and R06 exhibited higher hardness and moduli. The reversion resistance of the recipes with the present zinc clays was also improved relative to recipes without the present zinc clays.

Example 10

Preparation of Tire Tread Formulations

Tire tread formulations were mixed in two stages. The first stage consisted of ingredients as shown below:

| Recipe | 10A | 10E | 10F |
|---|---|---|---|
| Mixing method | AA | AA | AA |
| Natural rubber, STR 5 L | 100 | 100 | 100 |
| Carbon Black N330 | 48.5 | 48.5 | 48.5 |
| Zinc Organoclay, R03 | — | 7 | — |
| Organoclay, R06 | — | — | 7 |
| Aromatic oil | 4 | 4 | 4 |
| Stearic acid | 2 | 2 | 2 |
| Santoflex 6 PPD | 1 | 1 | 1 |

In a second stage, 4 phr of white seal zinc oxide was then added to each formulation in a two roll mill at 100° C. rotor temperature over 3.5 minutes. Then 2 phr of accelerator TBBS and 2 phr of sulfur were added to each formulation at 70 to 80° C. rotor temperature over 3 minutes The formulations were then deliberately overcured at 160° C. for 60 minutes, yielding tread compositions with the following characteristics:

| Recipe | control 10A | invention 10E | control 10F |
|---|---|---|---|
| Hardness, shore A | 65.4 | 69.8 | 68.5 |
| 100% modulus, MPa | 3.23 | 4.73 | 4.34 |
| 200% modulus, MPa | 9.47 | 12.53 | 12.12 |
| Tensile strength, MPa | 23.7 | 23.2 | 23.2 |
| Elongation at break, % | 373 | 324 | 326 |
| Abrasion, DIN, Vol. loss mm$^3$ | 103 | 126 | 128 |
| Reversion, %, DIN 53 529 | 13.98 | 10.73 | 15 |
| Max Torque, lb. in | 44.9 | 49.3 | 48.3 |
| Torque at 70 min. lb. in | 40.1 | 45.1 | 42.6 |
| $D_{001}$ Spacing of the 1$^{st}$ stage mix, Angstroms | N/A | 40.85 | 32.6 |

In the event rubber products are overcured, the above results indicate the present zinc organoclay is better than conventional organoclay in terms of modulus, abrasion, reversion, etc. The larger $D_{001}$ spacing of the rubber mix with the present zinc organoclays compared with conventional organoclays also indicates easier exfoliation. A master batch of 100 phr of zinc clay in nitrile rubber has a $D_{001}$ spacing of 21.2 angstroms verses $D_{001}$ spacing of only 12.5 angstroms for a master batch of 100 phr of zinc clay in natural rubber. This indicates exfoliation performance among different rubbers may vary.

CONCLUSION/SUMMARY

Thus, the invention concerns zinc clays, methods of making zinc clays, and various applications of such zinc clays, including applications in rubber and other polymer materials and the like, in which the zinc clays function, e.g., as one or more of an anti-reversion agent, a vulcanization activator and/or accelerator, a rheology modifying agent, a filler and/or a reinforcing agent for rubber or plastics (especially in tires). Zinc clays of the present invention may afford a higher zinc content in zinc clays relative those produced by conventional methods. Zinc clays of the present invention may also be used as carriers of nutrients and in industrial catalyst formulations. Thus, products containing the present zinc clays may enjoy similar or better properties than comparative products that include a zinc clay prepared by conventional methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:
1. A method for preparing a zinc clay, comprising:
   a) adding a slurry of a cation-exchangeable clay having a cation exchange capacity in a range of about 50 milliequivalents per 100 grams of clay to about 150 milliequivalents per 100 grams of clay to a zinc ammonia carbonate complex solution to form a zinc clay suspension, wherein said cation-exchangeable clay is selected from the group consisting of bentonite clays, smectite clays, vermiculite clays and mixtures thereof; calcium montmorillonite, sodium montmorillonite, synthetic vermiculites, and mixtures thereof;
b) agitating and then filtering the zinc clay suspension and removing zinc ions with an aqueous composition comprising ammonia and $CO_2$ to isolate the zinc clay, wherein the isolated zinc clay includes an amount of zinc ions that are insoluble in an aqueous solution of ammonia and carbon dioxide that exceeds the cation exchange capacity of the cation-exchangeable clay; and
c) heating and drying the isolated zinc clay.

2. The method of claim 1, further comprising heating the zinc clay suspension.

3. The method of claim 1, further comprising milling said zinc clay suspension and/or said isolated zinc clay.

4. The method of claim 1, wherein removing said zinc ions comprises washing the isolated zinc clay with a washing composition comprising water, ammonia and carbon dioxide.

5. The method of claim 1, wherein said isolated zinc clay has a zinc content of from about 1 wt % to about 70 wt %.

6. The method of claim 4, wherein said isolated zinc clay has a zinc ion content of from about 1 wt % to about 12 wt % zinc ion.

7. The method of claim 1, further comprising treating said cation-exchangeable clay with an acid prior to said mixing.

8. The method of claim 7, further comprising adjusting the pH of the cation-exchangeable clay to about 9 or greater with a base prior to said mixing.

9. A method for preparing a zinc organoclay, comprising:
a) adding a slurry of a cation-exchangeable clay having a cation exchange capacity in a range of about 50 milliequivalents per 100 grams of clay to about 150 milliequivalents per 100 grams of clay and a zinc ammonia carbonate complex solution to form a zinc clay, wherein said cation-exchangeable clay is selected from the group consisting of bentonite clays, smectite clays, vermiculite clays, and mixtures thereof
b) agitating and then filtering the zinc clay suspension to isolate the zinc clay and removing zinc ions with an aqueous composition comprising ammonia and $CO_2$, wherein the zinc clay includes an amount of zinc ions that are insoluble in an aqueous solution of ammonia and carbon dioxide that exceeds the cation exchange capacity of the cation-exchangeable clay; and
c) mixing said zinc clay with an ammonium salt having an organic group to form said zinc organoclay.

10. The method of claim 9, wherein mixing said zinc clay with said ammonium salt comprises:
a) mixing said zinc clay with said ammonium salt or applying said ammonium salt to said zinc clay to form a mixture;
b) drying said mixture; and
c) milling said zinc organoclay.

11. The method of claim 9, wherein said ammonium salt comprises one or more compounds of the formula $R_4NX$, where each instance of R is independently hydrogen, or $C_1$-$C_{24}$ alkyl, $C_2$-$C_{24}$ alkenyl, $C_6$-$C_{20}$ aryl, $C_7$-$C_{20}$ aralkyl, mono- or dialkyaminoalkylene, $C_1$-$C_{24}$ hydroxyalkyl, (CO)$R^1$, or (CO)O$R^1$, where $R^1$ is $C_1$-$C_{24}$ alkyl, $C_2$-$C_{24}$ alkenyl, $C_6$-$C_{20}$ aryl, or $C_7$-$C_{20}$ aralkyl, and X comprises a halide, a sulfate, a nitrate or an acetate, wherein at least one instance of R is an organic group.

12. The method of claim 11, wherein said ammonium salt is selected from the group consisting of methyl tallow bis-2-hydroxyethyl ammonium halides, methyl tallow bis-2-hydroxyethyl ammonium alkyl sulfates, methyl tallow bis-2-hydroxyethyl ammonium nitrate, methyl tallow bis-2-hydroxyethyl ammonium hydroxide, dimethyl hydrogenated-tallow (2-ethylhexyl) ammonium halides, dimethyl hydrogenated-tallow (2-ethylhexyl) ammonium alkyl sulfates, dimethyl hydrogenated-tallow (2-ethylhexyl) ammonium nitrate, dimethyl hydrogenated-tallow (2-ethylhexyl) ammonium hydroxide, dimethyl dehydrogenated-tallow ammonium halides, dimethyl dehydrogenated-tallow ammonium alkyl sulfates, dimethyl dehydrogenated-tallow ammonium nitrate, dimethyl dehydrogenated-tallow ammonium hydroxide, dimethyl dehydrogenated-tallow ammonium acetate, di-methyl tallowalkyl octyl ammonium methyl sulfate, di-methyl di-hydrogenated tallow alkyl ammonium chloride, methyl trialkyl ammonium chloride, trimethyl alkyl ammonium chloride, dimethyl dialkyl ammonium chloride, dimethyl alkyl allyl ammonium chloride, dimethyl diallyl ammonium chloride, and alkyl benzyldimethyl ammonium chloride.

13. The method of claim 9, wherein the ammonium salt is formed in situ with an amine and an acid.

14. The method of claim 13, wherein said amine is selected from the group consisting of laurylamine, stearylamine, methylamine, ethylamine, butylamine, dimethylamine, diethylamine, propylamine, dipropylamine, methylbutylamine, dialkylaminoalkylamine, ethylene diamine, tallow amine and mixtures thereof.

15. A composition, comprising:
a. one or more rubbers; and
b. the zinc clay prepared by the method of claim 1.

16. The method of claim 4, further comprising collecting the washing composition and zinc removed from the zinc clay after washing the isolated zinc clay with the washing composition and recycling the water, the ammonia, the carbon dioxide, and the zinc.

17. The method of claim 4, further comprising washing the zinc clay with water after washing the isolated zinc clay with the washing composition.

18. The method of claim 9, wherein said zinc organoclay has a zinc content of from about 1 wt % to about 70 wt %.

19. The method of claim 9, wherein said zinc clay contains from about 1 wt % to about 12 wt % zinc ion.

20. The method of claim 9, wherein said zinc organoclay contains from about 3 wt % to about 50 wt % of said ammonium salt.

21. The method of claim 9, further comprising adjusting the pH of the clay to about 9 or greater with a base prior to said mixing.

22. The method of claim 1, wherein said zinc clay has a zinc ion content of from about 5 wt % to about 12 wt % zinc ion.

23. The method of claim 13, wherein said zinc clay contains from about 5 wt % to about 12 wt % zinc ion.

24. The method of claim 1, wherein said cation exchangeable clay comprises a bentonite clay.

25. The method of claim 9, wherein said cation exchangeable clay comprises a bentonite clay.

26. A method for preparing a zinc clay, comprising:
a) treating a cation-exchangeable clay having a cation exchange capacity in a range of about 50 milliequivalents per 100 grams of clay to about 150 milliequivalents per 100 grams of clay with an acid, wherein said cation-exchangeable clay is selected from the group consisting of bentonite clays, smectite clays, vermiculite clays and mixtures thereof; calcium montmorillonite, sodium montmorillonite, synthetic vermiculites, and mixtures thereof;
b) adjusting the pH of the cation-exchangeable clay to about 9 or greater with a base;

c) adding a slurry of said cation-exchangeable clay to a zinc ammonia carbonate complex solution to form a zinc clay suspension;
d) agitating the zinc clay suspension;
e) heating the agitated zinc clay suspension to remove ammonia from the zinc clay suspension and precipitate zinc oxide and/or zinc carbonate onto said cation-exchangeable clay in said zinc clay suspension;
f) filtering the heated zinc clay suspension to isolate a zinc clay, wherein the isolated zinc clay includes (i) an amount of zinc ions that are insoluble in an aqueous solution of ammonia and carbon dioxide that exceeds the cation exchange capacity of the cation-exchangeable clay and (ii) excess zinc in the isolated zinc clay; and
g) drying the isolated zinc clay.

27. The method of claim 26, wherein heating the agitated zinc clay suspension comprised boiling the zinc clay suspension.

28. The method of claim 26, wherein the pH of the acid-treated cation-exchangeable clay is adjusted with the base, then a slurry of the cation-exchangeable clay having the pH of about 9 or greater is added to the zinc ammonia carbonate complex solution to form the zinc clay suspension.

29. The method of claim 26, wherein said cation-exchangeable clay is a bentonite clay.

30. The method of claim 26, wherein said isolated zinc clay has a zinc content of from about 3 wt % to about 70 wt %.

31. A method for preparing a zinc organoclay, comprising:
a) adding a slurry of a cation-exchangeable clay having a cation exchange capacity in a range of about 50 milliequivalents per 100 grams of clay to about 150 milliequivalents per 100 grams of clay and a zinc ammonia carbonate complex solution to form a zinc clay, wherein said cation-exchangeable clay is selected from the group consisting of bentonite clays, smectite clays, vermiculite clays, and mixtures thereof;
b) agitating and then filtering the zinc clay suspension and removing zinc ions with an aqueous composition comprising ammonia and $CO_2$ to isolate the zinc clay, wherein the isolated zinc clay includes an amount of zinc ions that are insoluble in an aqueous solution of ammonia and carbon dioxide that exceeds the cation exchange capacity of the cation-exchangeable clay;
c) spraying said zinc clay with a solution of an ammonium salt having an organic group; and
d) mixing and heating said zinc clay sprayed with said solution of an ammonium salt to form said zinc organoclay.

32. The method of claim 31, wherein said cation-exchangeable clay is a bentonite clay.

33. The method of claim 31, wherein said isolated zinc clay has a zinc ion content of from about 3 wt % to about 12 wt % zinc ion.

* * * * *